(12) United States Patent
Kojima et al.

(10) Patent No.: US 6,992,119 B2
(45) Date of Patent: Jan. 31, 2006

(54) TIRE PUNCTURE SEALANT

(75) Inventors: Yoshihide Kojima, Kobe (JP);
Masahiro Kishida, Kobe (JP);
Takaichiro Shimokado, Fuchu (JP)

(73) Assignee: Sumitomo Rubber Industries, Ltd., Kobe (JP)

( * ) Notice: Subject to any disclaimer, the term of this patent is extended or adjusted under 35 U.S.C. 154(b) by 278 days.

(21) Appl. No.: 10/614,208

(22) Filed: Jul. 8, 2003

(65) Prior Publication Data

US 2004/0048962 A1 Mar. 11, 2004

(30) Foreign Application Priority Data

Jul. 8, 2002 (JP) .............................. 2002-198973

(51) Int. Cl.
*C09K 3/12* (2006.01)
(52) U.S. Cl. ...................................... 523/166; 524/386
(58) Field of Classification Search .................... None
See application file for complete search history.

(56) References Cited

U.S. PATENT DOCUMENTS

| | | | |
|---|---|---|---|
| 4,116,895 A * | 9/1978 | Kageyama et al. | 524/574 |
| 6,063,837 A * | 5/2000 | Kawamura et al. | 523/166 |
| 6,864,305 B2 * | 3/2005 | Kishida et al. | 524/386 |

FOREIGN PATENT DOCUMENTS

| | | | |
|---|---|---|---|
| EP | 0 753 420 A2 | | 1/1997 |
| EP | 0 846 552 A2 | | 6/1998 |
| JP | 09118779 A | * | 5/1997 |
| JP | 2000-272022 A | | 10/2000 |
| JP | 2001-198986 A | | 7/2001 |

OTHER PUBLICATIONS

JPO machine translation of JP 09-118779-A.*
JPO machine translation of JP 2001-198986-A.*
JPO machine translation of JP 2000-272022-A.*
USPTO obtained translation of Tables 1 & 2 in JP 2000-272022.*

* cited by examiner

*Primary Examiner*—Matthew A. Thexton
(74) *Attorney, Agent, or Firm*—Birch, Stewart, Kolasch & Birch, LLP

(57) ABSTRACT

A tire puncture sealant comprises a latex of natural rubber, an emulsion of a tackifier and an antifreezing agent, wherein the tackifier is an aromatic modified terpene resin, and given that the total A+B+C of the solid content A of the natural rubber latex, the solid content B of the tackifier emulsion and the content C of the antifreezing agent is 100 weight %, the solid content A of the natural rubber latex is in a range of from 30 to 60 weight %, the solid content B of the tackifier emulsion is in a range of from 10 to 30 weight %, and the content C of the antifreezing agent is in a range of from 20 to 50 weight %.

2 Claims, 1 Drawing Sheet

TIRE PUNCTURE SEALANT

Figure 1:
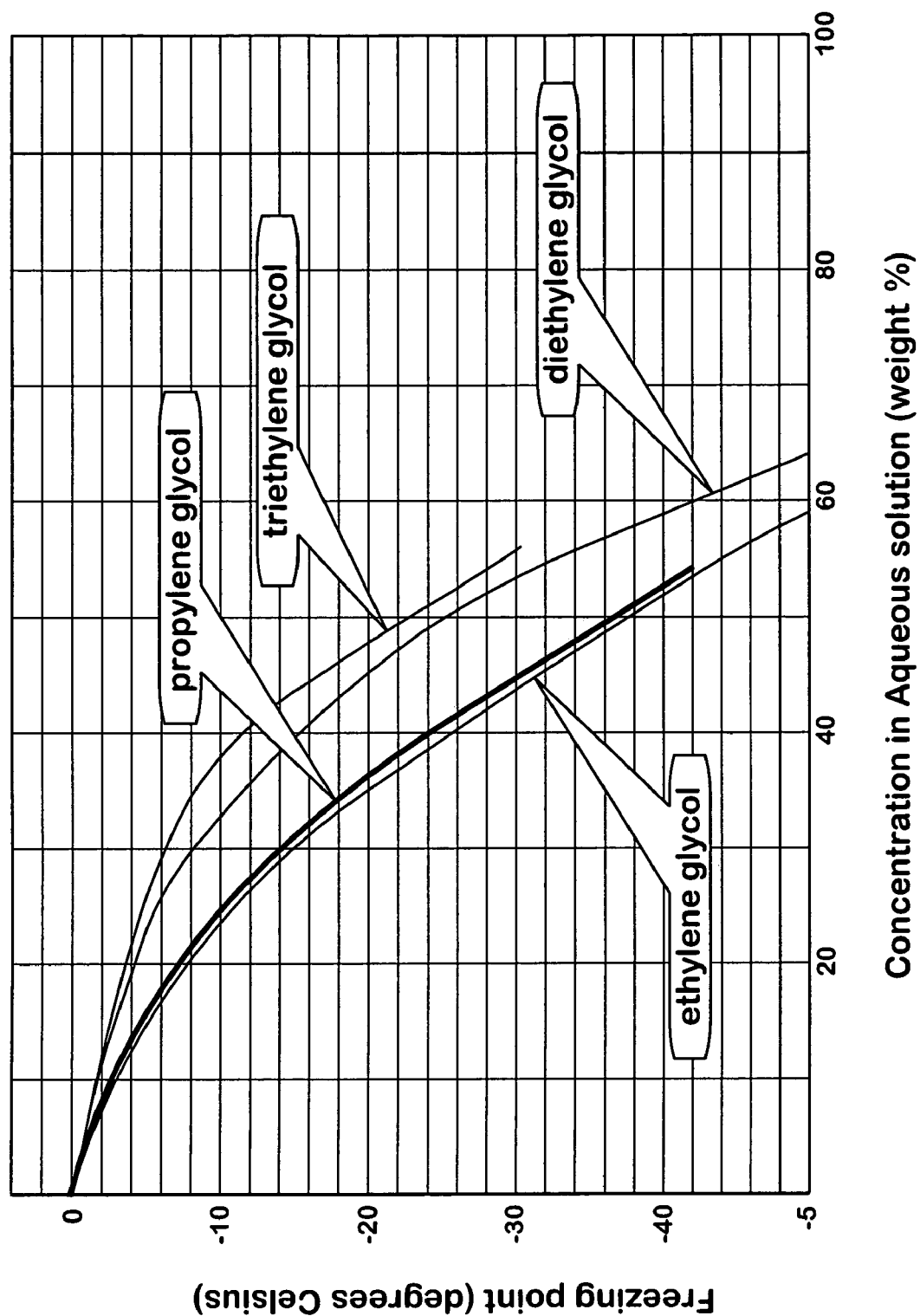

The present invention relates to a tire puncture sealant, more particularly to an improved formula therefor being capable of prolonging the storage life.

A liquid tire puncture sealant which is injected into a pneumatic tire when punctured is very useful for emergency repair of a puncture wound in the tread portion. As well known in the art, the puncture sealant usually comprises a natural rubber latex, a tackifier and an antifreezing agent.

Conventionally, terpene phenol resin is widely used as the tackifier because of its high compatibility with natural rubber in the latex and excellent adhesion to the tire rubber.

Recently, on the other hand, the frequency of the occurrence of tire puncture is decreased to 1 time per 70,000 km running or 6 or 7 years in most areas. Thus, there is a tendency for the storage time of the sealant until use to become very long. Therefore, it is very important to prolong the quality guaranteed term. Thus, the causes for the deterioration of puncture sealant when stored in a location in the vehicle such as car trunk for a long period of time, were investigated and as a result the following became clear. (1) The above-mentioned terpene phenol resin tends to react with ammonia which is added in the natural rubber latex for the purpose of antisepsis, and the terpene phenol resin dissolves (being decomposed), and the tackiness decreases. As a result, the rubber particles become hard to adhere to the wall of the puncture hole and the sealing performance is deteriorated. (2) Depending on the climate conditions, the sealant stored in the car often undergoes severe temperature conditions such that the temperature widely varies for example from about −40 deg. C. to about +80 deg. C. The terpene phenol resin is inferior in heat stability, if the terpene phenol resin is deteriorated by heat, its ionic repulsive force to the rubber particles of the natural rubber latex decrease, and the rubber particles aggregate. As a result, the sealant turns into a creamy state, greatly decreasing the sealing effect. Further, the commercial value of the sealant tends to decrease due to the browning of the terpene phenol resin with time. Incidentally, if the latex is frozen, the natural rubber particles are agglomerated. The agglomerated particles never revert to the original dispersed state even when unfreezed and the sealing performance greatly deteriorates.

It is therefore, an object of the present invention to provide a tire puncture sealant, of which sealing performance can be maintained for a long period of time even under severe temperature conditions, and the storage life is prolonged.

An embodiment of the present invention will now be described in detail in conjunction with the accompanying drawing.

FIG. 1 is a graph showing the freezing point (degrees Celsius) of various aqueous solutions of glycol as a function of the glycol concentration (weight %).

According to the present invention, a tire puncture sealant comprises a natural rubber latex, an emulsion of a tackifier and an antifreezing agent.

Natural rubber latex displays an excellent sealing effect. Thus, in this invention, natural rubber latex is used as usual. But, it is preferable to use a deproteinized natural rubber latex from which protein is removed because it is possible to prevent the latex from becoming putrid with using fewer or no ammonia, and as a result, bad smell and corrosion of steel tire cords caused by ammonia can be lessened or prevented.

As to the tackifier in this invention, an aromatic modified terpene resin is used. The aromatic modified terpene resin is made by carrying out cationic polymerization of a terpene compound and an aromatic compound under the Friedel crafts catalyst. Also the hydrogenerated aromatic modified terpene resin which can be obtained by carrying out hydrogenation processing of the aromatic modified terpene resin can be used as the tackifier. Hereinafter, the hydrogenerated and non-hydrogenerated aromatic modified terpene resins are simply referred as the "aromatic modified terpene resins".

Terpene compounds mean polymers of isoprene ($C_5H_8$) which are generally classified into three types: monoterpene ($C_{10}H_{16}$); sesquiterpene ($C_{15}H_{24}$); and diterpene ($C_{20}H_{32}$). The above-mentioned terpene compound includes one of these as its basic structure. In this embodiment, monoterpene is preferably used. More specifically, the following are listed as the terpene compound, for example:

| | |
|---|---|
| myrcene, | allo-ocimene, |
| ocimene, | alpha-pinene, |
| beta-pinene, | dipentene, |
| limonene, | alpha phellandrene, |
| alpha-terpinene, | gamma-terpinene, |
| terpinene, | 1,8-cineole, |
| 1,4-cineole, | alpha-terpineol, |
| beta-terpineol, | gamma-terpineol, |
| camphene, etc. | |

Preferably, alpha-pinene, beta-pinene, dipentene, myrcene or alpha-terpinene is used.

| | |
|---|---|
| styrene, | alpha methyl styrene, |
| vinyltoluene, | divinyl toluene, |
| 2-phenyl-2-butene, etc. | |

The tackifier emulsion is made by emulsifying the aromatic modified terpene resin using an emulsifier.

As the emulsifier, the following are listed for example:
Anionic surface active agents such as
  alkali metal salts of rosin,
  alkyl benzene sulfonate,
  polyoxyethylene alkyl phenyl ether sulfate,
  alkyl naphthalene sulfonate,
  Polyoxy-mono and distyril phenylether monoester sulfosuccinates, and
  alkyl phenoxy polyoxyethylene propyl sulfonates;
Nonionic surface active agents such as
  polyoxyethylene alkyl ether, and
  polyoxyethylene alkyl phenyl ether; and
Cationic surface active agents such as
  tetraalkyl ammonium chloride
  trialkyl benzyl ammonium chloride
  alkyl amine salt,
  monooxyethylene alkyl amine salt, and
  polyoxyethylene alkyl amine salt etc.

The solid content B of the tackifier emulsion (namely, the aromatic modified terpene resin therein) is preferably set in a range of 30 to 70 weight % of the gross weight of the emulsion.

As the aromatic modified terpene resin is stable to ammonia if added to the latex, its gradual dissolution or decomposition by the added ammonia and the resultant gradual deterioration of the tackiness with time during storage can be effectively prevented. Further, as the aromatic modified terpene resin is heat-stable, it can prevent the rubber particles in the latex from becoming creamy even if the temperature change is wide during storage. Furthermore, as the aromatic modified terpene resin has high compatibility with natural rubber as compared with the conventionally used terpene phenol resins, there may be expected an improvement in the low-temperature sealing performance and the durability of the sealing.

Given that the total A+B+C of the solid content A of the natural rubber latex, the solid content B of the tackifier emulsion and the content C of the antifreezing agent is 100 weight %, the solid content B (resin) is set in the range of from 10 to 30 weight % of the total A+B+C. If less than 10 weight %, the tackiness becomes insufficient and it is difficult to obtain the necessary sealing performance and durability of the sealing. If more than 30 weight %, as the rubber content decreases relatively, the sealing performance deteriorates.

As to the solid content A (rubber), on the other hand, in order that the puncture sealant goes into the puncture holes quickly and blocks up the puncture holes readily and the sealing effect is held for a certain traveling distance, the solid content A is set in a range of from 30 to 60 weight % of the total A+B+C. Incidentally, the solid content of general natural rubber latex is about 60 weight % of the gross weight of the latex.

As to the antifreezing agent, preferably, ethylene glycol and/or propylene glycol are used.

In FIG. 1, the temperature at the freezing point of various aqueous solutions of glycol is shown as a function of the glycol concentration of the solution. As shown in this graph, ethylene glycol and propylene glycol are excellent in the antifreeze effect when compared with other glycol.

By setting the content C of ethylene glycol and propylene glycol in a range of from 20 to 50 weight % of the total A+B+C, it becomes possible to make the freezing temperature of the puncture sealant lower than −30 or −40 degrees C.

The puncture sealant may be regarded as a latex in which the natural rubber particles and the tackifier resin particles are dispersed and suspended in the solution of the antifreezing agent by the ionic repulsive force between the rubber particles and resin particles.

The propylene glycol has a specific gravity which is closer to that of the natural rubber particles than the ethylene glycol. Thus, using propylene glycol as the antifreezing agent, the natural rubber particles can be prevented from surfacing during storage. If the rubber particle density increases near the surface, the rubber particles become creamy and the sealing performance deteriorates. Thus, use of the propylene glycol only is especially preferable.

In addition, the puncture sealant in this embodiment further comprises 0.4 to 2.0 weight % of a stabilizer. As the stabilizer, anionic surfactants, amphoteric surfactants and special carboxylate surfactants can be used. Especially, fatty acid salts having a carbon numbers of from 9 to 18 can be used preferably because such salts can prevent the solidification of the sealant in the valve core without deteriorating the sealing performance.

As to the fatty acids of the fatty acid salts having a carbon number of from 9 to 18,
  capric acid having a carbon number of 10,
  lauric acid having a carbon number of 12,
  myristic acid having a carbon number of 14,
  palmitic acid having a carbon number of 16,
  stearic acid having a carbon number of 18,
  oleic acid,
  linolic acid,
  linolenic acid, etc.
can be used.

As to the kind of salt of the fatty acid salts,
  sodium salt, potassium salt,
  ammonium salt, triethanolamine salt, etc.
can be used.

As the stabilizer, it is especially desirable to use
  lauric acid ammonium and/or
  lauric acid triethanolamine
because they demonstrate an outstanding effect to inhibit the solidification and this effect may increase in proportion to its content. The lauric acid ammonium however smells of ammonia. From this aspect, use of lauric acid triethanolamine is more preferred.

Comparison Test

According to the specifications shown in Table 1, puncture sealants were made and put in an oven to keep the temperature of the sealants at 80 degree C. for three months. Then, the sealing performance was tested as follows. At the same time, by filtering the sealant, the creamy agglutination of the latex was separated to measure the weight of the separated creamy agglutination. The measured weight is indicated in Table 1, using percentage based on the gross weight of the sealant.

In the sealing performance test, firstly a puncture hole was made on a pneumatic tire by penetrating a 4.0 mm diameter nail through the tread portion and pulling it out, and the sealant of 500 ml was injected into the tire using the tire valve. The tire pressure was increased up to 200 kpa and using a test car the tire was run for a distance of 10 km. Then, the puncture hole was checked in order to judge whether the puncture hole was sealed or not.

TABLE 1

| Sealant | Ex. | Ref. |
| --- | --- | --- |
| Deproteinized natural rubber latex | 40 | 40 |
| Solid content (wt. %) | | |
| Tackifier | | |
| Aromatic modified terpene resin emulsion (*1) | 20 | 0 |
| Solid content (wt. %) | | |
| Terpene phenol resin emulsion (*2) | 0 | 20 |
| Solid content (wt. %) | | |
| Antifreezing agent | | |
| Propylene glycol | 40 | 40 |
| Solid content (wt. %) | | |
| Creamy agglutination (wt. %) | 12 | 20 |
| Sealing performance | sealed | not sealed |

*1 "Nanolet TO" made by Yasuhara Chemical Co., Ltd.
*2 "Nanolet T" made by Yasuhara Chemical Co., Ltd.

The invention claimed is:

1. A tire puncture sealant comprising
   a latex of natural rubber,
   an emulsion of a tackifier and
   an antifreezing agent, wherein
   said tackifier is an aromatic modified terpene resin, and
   with respect to a total A+B+C of the solid content A of the natural rubber latex, the solid content B of the tackifier emulsion and the content C of the antifreezing agent which is 100 weight %,
   the solid content A of the natural rubber latex is in a range of from 30 to 60 weight %,
   the solid content B of the tackifier emulsion is in a range of from 10 to 30 weight %, and
   the content C of the antifreezing agent is in a range of from 20 to 50 weight %.

2. A tire puncture sealant according to claim 1, wherein said antifreezing agent is ethylene glycol and/or propylene glycol.

* * * * *